US010051027B2

(12) United States Patent
Kolekar et al.

(10) Patent No.: US 10,051,027 B2
(45) Date of Patent: Aug. 14, 2018

(54) COORDINATED CONTENT DISTRIBUTION TO MULTIPLE DISPLAY RECEIVERS

(71) Applicant: INTEL CORPORATION, Santa Clara, CA (US)

(72) Inventors: Abhijeet Kolekar, Hillsboro, OR (US); Ashish Singhi, Hillsboro, OR (US); Ajit Joshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,079

(22) PCT Filed: Jul. 22, 2013

(86) PCT No.: PCT/US2013/051505
§ 371 (c)(1),
(2) Date: Dec. 17, 2013

(87) PCT Pub. No.: WO2015/012795
PCT Pub. Date: Jan. 29, 2015

(65) Prior Publication Data
US 2015/0026357 A1 Jan. 22, 2015

(51) Int. Cl.
*G06F 15/16* (2006.01)
*H04L 29/06* (2006.01)
(Continued)

(52) U.S. Cl.
CPC .......... *H04L 65/602* (2013.01); *H04L 65/608* (2013.01); *H04L 65/80* (2013.01); *H04N 21/242* (2013.01); *H04N 21/4307* (2013.01)

(58) Field of Classification Search
CPC ......... H04L 29/06523; H04L 29/08072; H04L 29/06462; H04L 29/06027
(Continued)

(56) References Cited

U.S. PATENT DOCUMENTS 5,410,307 A * 4/1995 Hekstra ............... H04N 19/105
341/50
6,356,589 B1 * 3/2002 Gebler .................. H04N 19/30
375/240.1
(Continued)

FOREIGN PATENT DOCUMENTS

WO WO2013048484 A1 4/2013

OTHER PUBLICATIONS

International Search Report and Written Opinion dated Apr. 29, 2014 for International Application No. PCT/US2013/051505, 13 pages.
(Continued)

*Primary Examiner* — Normin Abedin
*Assistant Examiner* — Atta Khan
(74) *Attorney, Agent, or Firm* — Schwabe, Williamson & Wyatt, P.C.

(57) ABSTRACT

Apparatus, computer-readable storage medium, and method associated with content transmission are described. In embodiments, a computing device may include one or more content encoders, configured to encode content, a communication module, and a content distribution and coordination engine (CDCE). The communication module may be coupled with the one or more content encoders and may be configured to support a wireless networking protocol to wirelessly transmit encoded content to a plurality of display receivers. Each display receiver may be configured to support a display protocol. The CDCE may be coupled with the communication module and the one or more content encoders and may be configured to coordinate the one or more content encoders and the communication module to encode and respectively distribute a plurality of contents to the plurality of display receivers in accordance with the display protocol and the wireless networking protocol.

20 Claims, 3 Drawing Sheets

(51) Int. Cl.
*H04N 21/242* (2011.01)
*H04N 21/43* (2011.01)

(58) Field of Classification Search
USPC .......................................................... 709/231
See application file for complete search history.

(56) References Cited

U.S. PATENT DOCUMENTS

| | | | |
|---|---|---|---|
| 6,421,706 B1 | 7/2002 | McNeill et al. | |
| 6,760,749 B1 | 7/2004 | Dunlap et al. | |
| 8,750,293 B2* | 6/2014 | Holmer | H04N 7/24 370/353 |
| 8,850,184 B2* | 9/2014 | Imai | H04L 63/0428 713/153 |
| 2002/0049717 A1 | 4/2002 | Routtenberg et al. | |
| 2004/0073596 A1 | 4/2004 | Kloninger et al. | |
| 2005/0200695 A1 | 9/2005 | Maeda | |
| 2006/0095827 A1* | 5/2006 | Spencer | H04L 1/0041 714/752 |
| 2006/0129909 A1* | 6/2006 | Butt | G11B 20/10 715/201 |
| 2006/0282855 A1 | 12/2006 | Margulis | |
| 2009/0210474 A1* | 8/2009 | Shao | H04L 12/1877 709/201 |
| 2009/0225831 A1* | 9/2009 | Ota | H04N 19/124 375/240.03 |
| 2010/0226428 A1 | 9/2010 | Thevathasan et al. | |
| 2011/0158311 A1* | 6/2011 | Abadir | H04N 21/4788 375/240.01 |
| 2011/0304634 A1* | 12/2011 | Urbach | G06F 9/5016 345/501 |
| 2012/0144445 A1 | 6/2012 | Bonta et al. | |
| 2012/0173622 A1* | 7/2012 | Toledano | H04L 65/4076 709/204 |
| 2013/0258926 A1* | 10/2013 | Osakada | H04W 52/04 370/311 |
| 2013/0288707 A1* | 10/2013 | Nagata | G06Q 10/00 455/456.1 |
| 2013/0335519 A1* | 12/2013 | Greenslade | H04L 12/1881 348/14.13 |
| 2015/0012660 A1* | 1/2015 | Kuulusa | H04L 65/4084 709/231 |
| 2015/0326941 A1* | 11/2015 | Gao | H04N 21/43635 725/74 |

OTHER PUBLICATIONS

Partial Supplementary European Search Report dated Jan. 24, 2017 for European Application No. 13889912.5, 10 pages.
Anonymous: "VLC Media Player—2.0.7: Read me and News", Videolan, May 26, 2013, 70 pages, http://download.videolan.org/pub/videolan/vlc-2.0.7.tar.xz.
International Preliminary Report on Patentability dated Feb. 4, 2016 for International Application No. PCT/US2013/051505, 10 pages.
Extended European Search Report dated Apr. 20, 2017 for European Application No. 13889912.5, 24 pages.
V.M. Baskaran et al., "Analysis of Real-Time Multiple Source Video Streaming via Wireless 5.8 GHz for Intelligent Traffic Management System," 2005 IEEE Region 10 Conference, Nov. 21-24, 2005, Melbourne, Australia, pp. 1-5.

* cited by examiner

COORDINATED CONTENT DISTRIBUTION TO MULTIPLE DISPLAY RECEIVERS

CROSS REFERENCE TO RELATED APPLICATIONS

The present application is a national phase entry under 35 U.S.C. § 371 of International Application No. PCT/US2013/051505, filed Jul. 22, 2013, entitled "COORDINATED CONTENT DISTRIBUTION TO MULTIPLE DISPLAY RECEIVERS", which designated, among the various States, the United States of America. The Specification of the PCT/US2013/051505 Application is hereby incorporated by reference.

TECHNICAL FIELD

Embodiments of the present disclosure are related to the field of data processing, and in particular, to the field of content distribution to display receivers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile computing devices, such as smart phones, are continually becoming more abundant and more powerful. In addition, the bandwidth available to these mobile computing devices over the networks on which they operate continues to increase. As a result of these advances, the content available through these mobile computing devices has continued to increase. Traditionally, if a user wanted to access content, the user was restricted to the screen available on the mobile computing device. With advances in display technologies, such as the wireless display (WiDi) technology, developed and introduced by Intel®, the user is now able to view the content by wirelessly transmitting the content to a compatible display receiver. Typically, each content source may wirelessly provide the content to a single corresponding display receiver.

DETAILED DESCRIPTION OF ILLUSTRATIVE EMBODIMENTS

Figure 1:
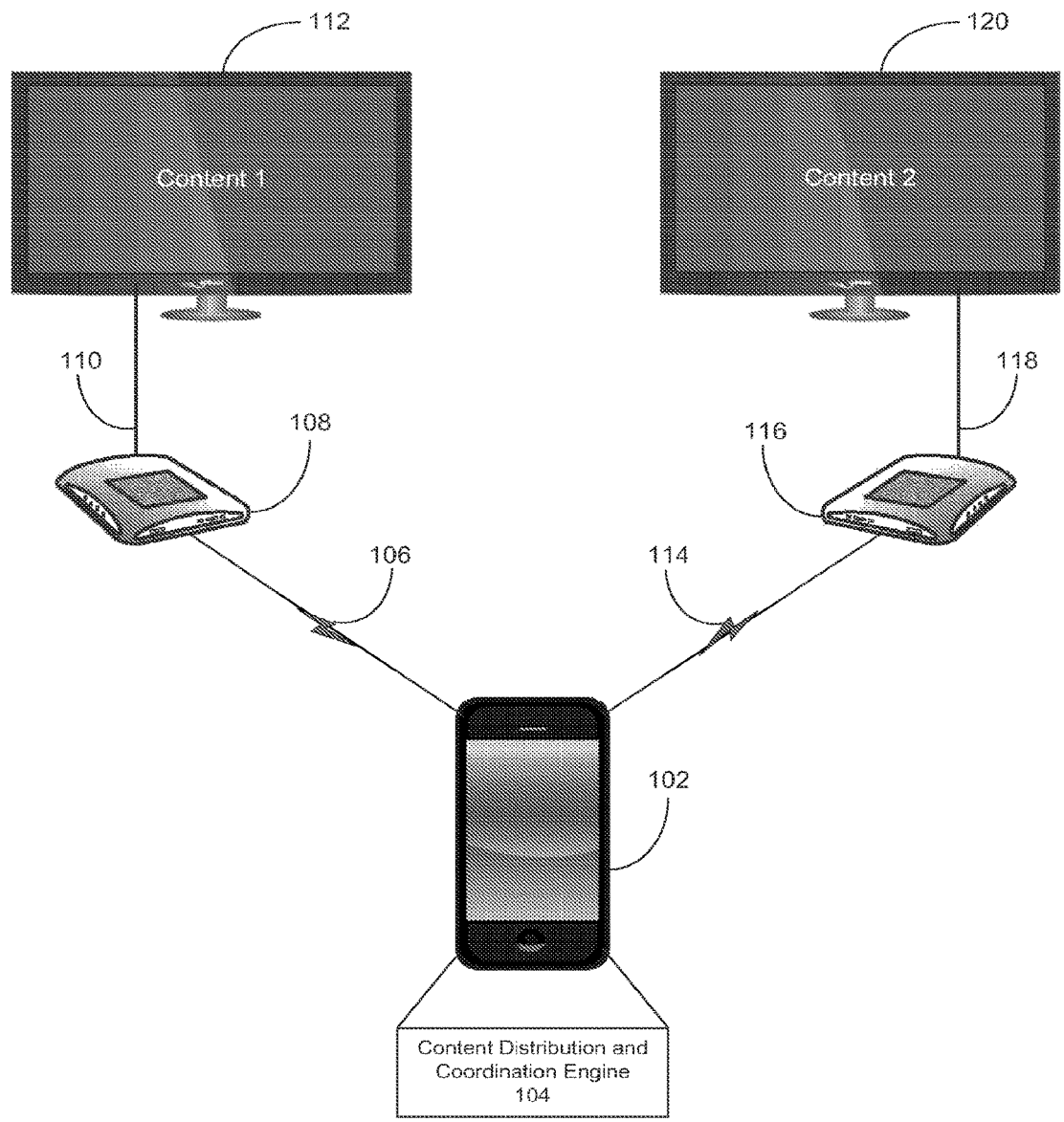
FIG. 1 depicts an illustrative environment in which some embodiments of coordinated content distribution to multiple display receivers of the present disclosure may be practiced.

A method, storage medium, and a computing device for content distribution to multiple receivers, are described. In embodiments, the computing device may include one or more content encoders, a communication module and a content distribution and coordination engine (CDCE). The one or more content encoders may be configured to encode content. The communication module may be coupled with the one or more content encoders and may be configured to support a wireless networking protocol to wirelessly transmit encoded content to a plurality of display receivers, wherein each display receiver is configured to support a peer-to-peer display protocol. The CDCE may be coupled to the communication module and the one or more content encoders and may be configured to coordinate the one or more content encoders and the communication module to encode and respectively distribute a plurality of contents to the plurality of display receivers in accordance with the peer-to-peer display protocol and the wireless networking protocol. The CDCE may have a plurality of content distribution and coordination policies that may include provision of encoding parameters to the one or more encoders to use to encode the contents. The encoding parameters may be selected in view of a number of contents to be concurrently encoded and distributed in parallel, interleavingly, and the number of content encoders available. In some embodiments, the computing device may be a smart phone, one or more of the display receivers may be Wireless Display (WiDi) receivers, the peer-to-peer display protocol may correspondingly be WiDi protocol and the wireless networking protocol may be WiFi protocol.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative environment in which some embodiments of coordinated content distribution to multiple display receivers of the present disclosure may be utilized. In embodiments, the environment may include a mobile computing device 102. Mobile computing device 102 may be provisioned with a content distribution and coordination engine (CDCE) 104. The CDCE 104 may be configured to enable mobile computing device 102 to establish concurrent wireless data connections with a plurality of display receivers 108 and 116. The CDCE 104 may be further configured to allow a user to select display receivers 108 and 116, from a plurality of eligible display receivers, and corresponding content to be transmitted over the concurrent wireless data connections and to coordinate the encoding and transmission of the content to the selected display receivers 108 and 116.

As depicted herein, mobile computing device 102 may be connected to display receivers 108 and 116 via wireless data connections 106 and 114, respectively. Wireless data connections 106 and 114 may utilize any form wireless network protocol including, but not limited to, Wi-Fi, Near Field Communication (NFC), Bluetooth®, Wireless USB and ZigBee®. Wireless data connections 106 and 114 may utilize the same wireless network protocol or may each utilize different protocols depending upon the circumstances.

Display receivers 108 and 116 may be any type of display receiver and, in addition to the wireless network protocol, may support any type of wireless display protocol, such as, but not limited to, Wireless Display (WiDi) from Intel® and Miracast. Display receivers 108 and 116 may support the same wireless display protocol or display receivers 108 and 116 may each support a different protocol.

In some embodiments, and as depicted here, display receivers 108 and 116 may be peripheral to a display unit with which the respective display receiver is connected. Where the display receiver is peripheral, any type of connection may be utilized to connect the display receiver and a corresponding display unit. As depicted here, display receivers 108 and 116 are connected to display units 112 and 120 via display connections 110 and 118. Display connections 110 and 118 may include, but are not limited to, High Definition Multimedia Interface (HDMI) connections, component video connections, composite audio and/or video connections, a coaxial connection, separate video (S-video) connections, or any combinations thereof. As depicted here, display units 112 and 120 may be televisions, however, this disclosure is not to be so limited and any displays capable of displaying the output of the associated display receivers are contemplated.

In other embodiments, not depicted here, one or more of the display receivers may be integrated into one or more respective displays. It will be appreciated that, while only two display receivers 108 and 116 are depicted herein, this disclosure should not be so limited. The teachings of this disclosure are equally applicable regardless of the number of display receivers and the number of display receivers may only be limited by the capabilities of mobile computing device 102 to encode and distribute content to the display receivers.

As depicted herein, display units 112 and 120 are concurrently displaying contents 1 and 2, respectively, received from mobile computing device 102. In embodiments, the CDCE 104 may enable a user of mobile computing device 102 to select contents 1 and 2 for transmission to display receivers 108 and 116 for display on displays 112 and 120, respectively. For instance, the user of mobile computing device 102 may select a first movie and a second movie for output to displays 112 and 120, respectively. In another instance, the user may select one or more application interfaces, such as the user's email client for output to display 112 and a PowerPoint presentation for output to display 120. In still other instances, a user may wish to share a single content source with multiple individuals, such as in a classroom setting where a teacher could select an educational presentation for output to tablet computing devices of the students and/or one or more other displays in the classroom. These instances are presented for illustrative purposes only and should not be thought of as limiting of this disclosure. The CDCE 104 will be discussed in greater detail below. While depicted herein as a smart phone, this is meant to merely be illustrative and mobile computing device 102 may be any type of mobile computing device including, but not limited to a smart phone, tablet, ultrabook, ebook, laptop computer, etc. It will be appreciated that mobile computing device need not be mobile and a stationary computing device may also be configured in the same, or similar, manner to that of the mobile computing device described herein.

Figure 2:
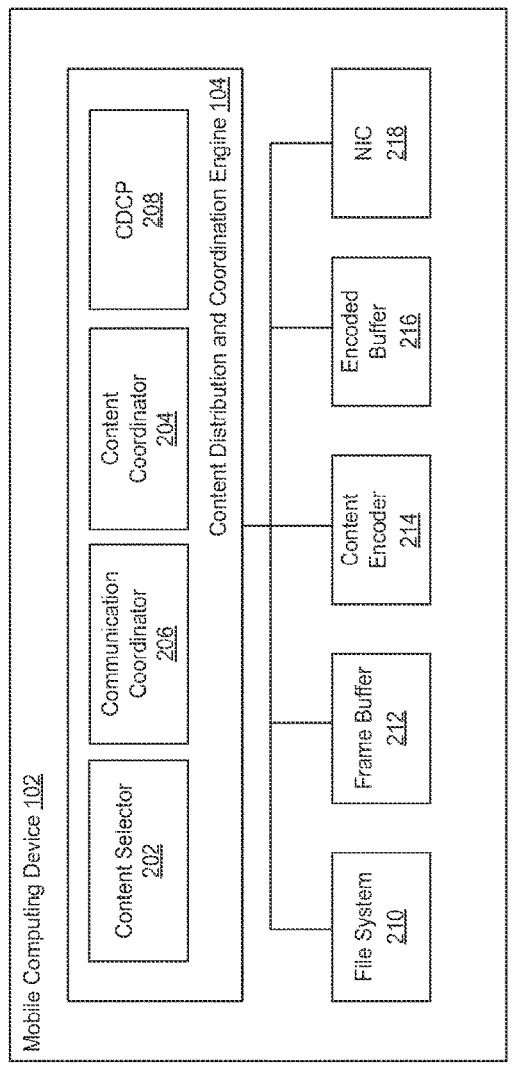
FIG. 2 depicts an illustrative mobile computing device capable of implementing some embodiments of the present disclosure.

FIG. 2 depicts an illustrative mobile computing device 102 capable of implementing some embodiments of the present disclosure. As depicted herein, mobile computing device 102 may include a content distribution and coordination engine (CDCE) 104, such as that discussed above in reference to FIG. 1. Mobile computing device 102 may further include file system 210, frame buffer 212, encoder 214, encoded buffer 216 and network interface controller (NIC) 218, each of these may be operatively coupled with one another and the CDCE 104.

File system 210 may be configured to organize, store, and retrieve stored data on mobile computing device 102. File system 210 may be a component of an operating system, not pictured, executing on mobile computing device 102. Frame buffer 212 may be configured to store content frames. The content frames in frame buffer 212 may be buffered until encoder 214 is available to process the frames. Encoder 214 may be configured to encode the content frames from frame buffer 212 and may output the encoded frames to encoded buffer 216. Encoded buffer 216 may store the encoded frames produced by encoder 214 for output or further processing. Network interface controller (NIC) 218 may be used to enable mobile computing device 102 to connect to one or more wired or wireless networks.

In some embodiments, the CDCE 104 may include content selector 202, content coordinator 204, communication coordinator 206, and a number of content distribution and coordination policies, CDCP 208. While depicted herein as separate individual pieces for ease of explanation, it will be appreciated that one or more of the components of the CDCE 104 may be combined into single components. Furthermore, these components may be implemented as hardware, software, or any combination thereof.

Content selector 202 may be configured to retrieve content available to mobile computing device 102. In some embodiments, content selector 202 may be configured to aggregate a list of available content and present the list for selection of content by a user of mobile computing device 102. Content may be available to mobile computing device 102 either locally through file system 210 or an application interface, not pictured, or may be retrieved from a remote source via, for example, NIC 218 or another networking interface, not pictured, such as Bluetooth, NFC, etc. An application interface may include any graphical content produced by an application of mobile computing device 102, such as a graphical user interface, for example. In some embodiments, remote sources of content may include online repositories such as Netflix®, Flickr®, Amazon®, a cloud data store of the user, or any other such online repository. Some of these repositories may require credentials, such as a username and password or other such authentication mechanism, to authenticate the user prior to allowing access to the content contained in the repository. In some embodiments, content selector 202, may be configured to store any such credentials to be utilized to automatically login to these online repositories. It will be appreciated that the available content may be presented to the user in any manner. This disclosure is equally applicable regardless of the manner of presentation.

Communication coordinator 206 may be configured to scan for available display receivers, such as display receivers 108 and 116 of FIG. 1. This may be accomplished by utilizing, for example, NIC 218, or may be accomplished utilizing other such wireless communication technology, not pictured, such as via a Bluetooth transceiver, near field communication (NFC) transceiver, etc. In some embodiments, communication coordinator 206 may also automatically establish a data connection with available display receivers. In other embodiments communication coordinator 206 may wait to establish a connection until directed to do so by a user or another component. After scanning for available display receivers, communication coordinator may assemble a list of the available display receivers for selection by the user. Once a display receiver has been selected, content selected via the content selector may be transmitted to the selected display receiver. The selection of the display receiver may occur prior to, in conjunction with, or after the selection of the content.

Communication coordinator 206 may be further configured to coordinate the transmission of a number of streams of content to a corresponding number of display receivers. This may be accomplished, for example, by utilizing a display protocol in conjunction with a wireless networking protocol. In some embodiments, the display protocol may be a peer-to-peer display protocol such as Wireless Display (WiDi) from Intel® or Miracast. Communication coordinator 206 may be configured to coordinate content streams over multiple wireless networking protocols and/or multiple wireless display protocols simultaneously. In some embodiments, communication coordinator 206 may be configured to interleave the content streams for parallel transmission to multiple display receivers. In some embodiments, this interleaved transmission may be accomplished by interleaving the packets to be transmitted to the respective display receivers.

Content coordinator 204 may be configured to retrieve the selected content from file system 210 and coordinate the encoding of the content for distribution of the content to one or more display receivers selected through the communication coordinator 206, such as, for example, display receivers 108 and 116 depicted in FIG. 1. In embodiments, content coordinator may be configured to supply frame buffer 212 with frames of selected content for encoding and to retrieve these frames from the encoded buffer 216. In instances where a single piece of content is selected for transmission to one or more display receivers this may merely involve streaming the frames of the selected content into the frame buffer 212 and retrieving the encoded frames from encoded buffer 216. This same process may also occur where mobile computing device 102 has a number of content encoders greater than or equal to the number of selected content streams.

In some instances, however, the number of content streams may be greater than the number of available content encoders. In these instances, content coordinator may be configured to coordinate the encoding of N content streams on n content encoder instances, where N and n are integers, and N is greater than n, e.g., two content streams on a single content encoder. To accomplish this, the content coordinator 204 may be configured to intermingle, or interleave, frames from the two or more contents in frame buffer 212. These intermingled contents may appear to the content encoder as a single stream of content which the content encoder would encode and output into the encoded buffer 216. The content coordinator may be further configured to retrieve the encoded content from encoded buffer 216 and partition the encoded content frames to reassemble the content frames back into encoded versions of the two or more separate content streams. In order to accomplish this, and meet a required frame rate by content encoder 214, content coordinator 204 may be configured to adjust parameters associated with content encoder 214. In some embodiments, these parameters may cause the content encoder to encode all frames utilizing only intra-frame video compression, as opposed to interframe video compression. Encoding each frame as intra-frames may enable each frame to be compressed relative to only the information contained in the instant frame. Interframe on the other hand utilizes information from the preceding and/or following frame to further compress the instant frame. In some embodiments, these parameters may cause the content encoder to encode all frames at the same resolution. In some embodiments, these parameters may only be adjusted when the content coordinator is utilizing a number of content encoders to encode a greater number of content streams. These parameters are discussed further in reference to the CDCP 208, below.

The intermingling of the content frames may merely be an alternating of frames from each content stream. In these embodiments, it will be appreciated that the frame rate of the content encoder may be equally divided among the number of content streams. For example, a content encoder capable of 60 frames per second (fps) that is encoding two content streams would be capable of 30 fps for each content stream. In some instances, it may not be desirable to have a certain type of content fall below a specific frame rate. In these instances, the intermingling may be weighted accordingly such that one content stream that may require a higher frame rate has more frames placed in the frame buffer than other content streams. For example, if content encoder 214 is capable of 60 fps, and a specific type of content does not display well at less than 40 fps, then 2 frames of that specific type of content may be placed in the frame buffer 212 for every frame of other content that is placed in the frame buffer 212. This would result in the specific type of content maintaining the desired 40 fps while the other content would drop to 20 fps. This type of distinction between content may be accomplished by setting certain content distribution and coordination policies, depicted here as CDCP 208.

The CDCP 208 may be a repository of predefined policies for the CDCE 104 to implement. The CDCP 208 policies may concern the operation of any aspect of the CDCE including those operations discussed above with respect to the content selector 202, communication coordinator 206, and content coordinator 204. The CDCP 208 policies may be predefined or may be dynamically determined based upon resources available on the mobile computing device 102. In some embodiments, a user of mobile computing device 102 may be able to adjust the settings depending upon personal preference. In some embodiments, as discussed above, one policy may concern specific types of content and may define a minimum acceptable frame rate for the specific type of content. In some embodiments, one policy may concern whether to perform intra-frame encoding and/or when to perform intra-frame encoding. For example, if a user doesn't mind all content being encoded as intra-frames the user may designate that all content is to be so encoded. In some instances, the user may prefer interframe encoding and may designate that the content encoder is to attempt interframe encoding of every frame. In some embodiments, the user may designate that when a number of content streams is greater than available content encoders that each frame should be encoded at a specific resolution. In some embodiments the specific resolution may be dynamically determined based upon the resolution of the content streams or based upon the resolutions of the display receivers. For example, if one display receiver is capable of 720p and another display receiver is capable of 1080p then the encoding of the content streams may be limited to 720p. In another example, it may desirable to pad frames with a smaller resolution to match frames with a greater resolution and thus the resolution may be set to the greater resolution. In some embodiments, it may be desirable to limit the number of content streams that may be simultaneously encoded to ensure an acceptable frame rate is achieved. The number of acceptable content streams may be predefined or may be determined based upon the capabilities of the available content encoder(s), such as content encoder 214. It will be appreciated that these policies are merely presented for illustrative purposes and that any policy concerning the retrieval, encoding, or distribution of content is contemplated.

Figure 3:
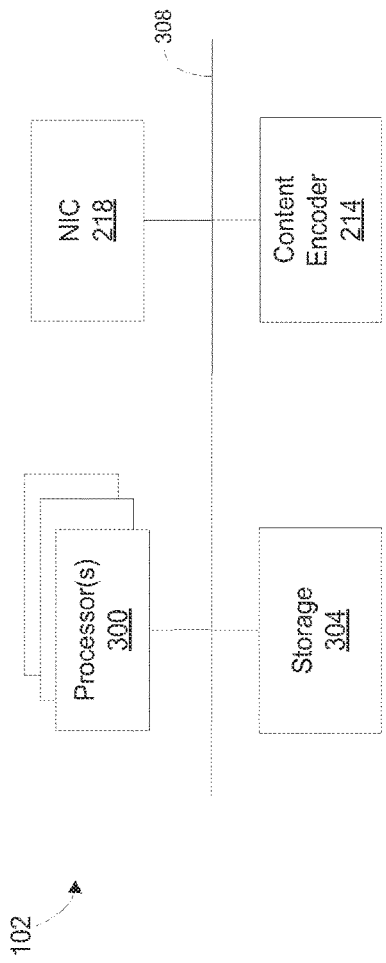
FIG. 3 depicts another illustrative representation of a mobile computing device in which some embodiments of the present disclosure may be implemented.

FIG. 3 depicts an illustrative configuration of computing device 102 according to some embodiments of the disclosure. Computing device 102 may comprise processor(s) 300, network interface card (NIC) 218, storage 304 and content encoder 214. Processor(s) 300, NIC 218, storage 304 and content encoder 214 may all be coupled together utilizing system bus 308. As depicted herein, NIC 218 and content encoder 214 may coincide with the same components described in FIG. 2 above.

Processor(s) 300 may, in some embodiments, be a single processor or, in other embodiments, may be comprised of multiple processors. In some embodiments the multiple processors may be of the same type, i.e. homogeneous, or they may be of differing types, i.e. heterogeneous and may include any type of single or multi-core processors. This disclosure is equally applicable regardless of type and/or number of processors.

In embodiments, NIC 218 may be used by mobile computing device 102 to access a network. In embodiments, NIC 218 may be used to access a wired or wireless network; this disclosure is equally applicable. NIC 218 may also be referred to herein as a communication module, network adapter, LAN adapter, or wireless NIC which may be considered synonymous for purposes of this disclosure, unless the context clearly indicates otherwise; and thus, the terms may be used interchangeably.

In embodiments, storage 304 may be any type of computer-readable storage medium or any combination of differing types of computer-readable storage media. For example, in embodiments, storage 304 may include, but is not limited to, a solid state drive (SSD), a magnetic or optical disk hard drive, volatile or non-volatile, dynamic or static random access memory, flash memory, or any multiple or combination thereof. In embodiments, storage 304 may store instructions which, when executed by processor(s) 300, cause computing device 102 to perform one or more operations of the process described in reference to FIG. 4, below, or any other processes described herein.

Figure 4:
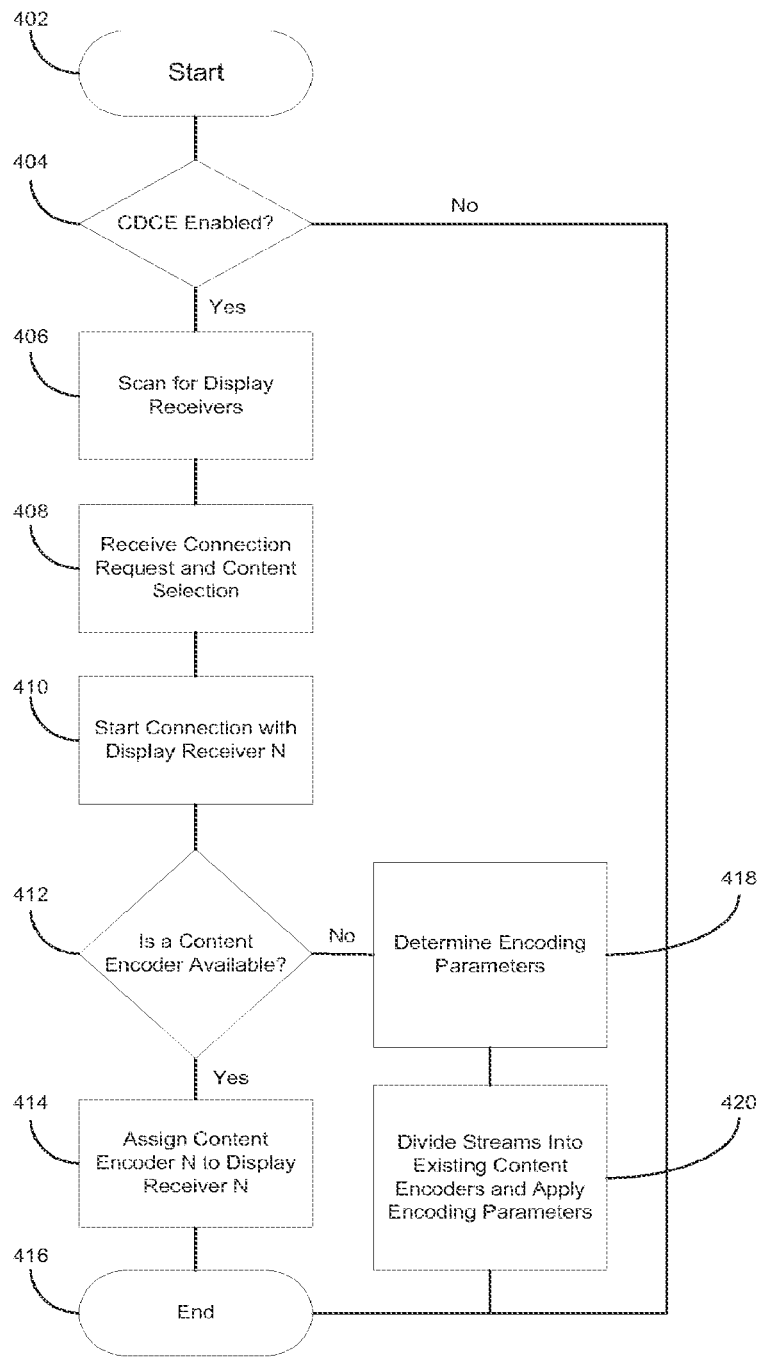
FIG. 4 depicts an illustrative process flow according to some embodiments of the present disclosure.

FIG. 4 depicts an illustrative process flow according to some embodiments of the present disclosure. The process may begin at block 402. In block 404 a determination may be made as to whether or not CDCE has been enabled. If CDCE has not been enabled then the process may jump to block 416 and end. If CDCE is enabled, then the process may proceed to block 406 where a scan for available display receivers may be performed. In block 408 a connection request and content selection may be received. This connection request may be at the direction of a user or another component and may contain an identifier of the display receiver with which to connect. At block 410 a connection may be established with the display receiver identified in the connection request. At block 412 a determination is made as to whether or not a content encoder is currently available. If a content encoder is available, then the process may proceed to block 414 where a content encoder is assigned for the selected content after which the process may proceed to block 416 and end. If a content encoder is not available then the process may move on to block 418 where encoding parameters may be determined. These parameters may be based upon the CDCP 208 discussed above in reference to FIG. 2. After the encoding parameters have been determined the process may proceed to block 420 where the selected content stream and one or more content streams already being encoded may be divided among the one or more content encoders. Where there is more than one content encoder the selected content stream and the one or more content streams may share the content encoders via a time sharing process or other such sharing mechanism. The process of sharing the content encoders may be determined by one or more policies of the CDCP and the determined encoding parameters may be applied to the one or more content encoders.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Example 1 is a computing device for content transmission comprising: one or more content encoders, each configured to encode content; a communication module coupled with the one or more content encoders, and configured to support one or more wireless networking protocols to wirelessly transmit encoded content to a plurality of display receivers, wherein each display receiver is configured to support a display protocol; and a content distribution and coordination engine, coupled to the communication module and the one or more content encoders, and comprising a plurality of content distribution and coordination policies configured to coordinate the one or more content encoders and the communication module to encode and respectively distribute a plurality of contents to the plurality of display receivers in accordance with the display protocol and the wireless networking protocol.

Example 2 may include the subject matter of Example 1, wherein the plurality of content distribution and coordination policies include provision of encoding parameters to the one or more encoders to use to encode the contents, and wherein the encoding parameters are selected in view of at least a number of contents to be concurrently encoded and distributed in parallel, interleavingly, and the number of the one or more content encoders.

Example 3 may include the subject matter of Example 2, wherein the content distribution and coordination engine is further configured to enable a user to select the number of contents and a corresponding number of display receivers to which the content distribution and coordination engine will distribute the number of contents.

Example 4 may include the subject matter of Example 1, wherein the display protocol is WiDi or Miracast.

Example 5 may include the subject matter of any one of Examples 2-4, wherein the number of contents include one or more application interfaces.

Example 6 may include the subject matter of any one of Examples 1-4, wherein one of the encoding parameters provisioned by the content distribution and coordination policies causes each of the number of contents to be assigned to respective ones of the one or more content encoders when the number of content encoders exceeds the number of contents to be concurrently encoded.

Example 7 may include the subject matter of any one of Examples 1-4, wherein one of the encoding parameters provisioned by the content distribution and coordination policies causes the one or more content encoders to encode the contents as intra-frames when the number of contents to be concurrently encoded exceeds the number of content encoders.

Example 8 may include the subject matter of any one of Examples 1-4, wherein one of the encoding parameters provisioned by the content distribution and coordination policies causes the one or more content encoders to encode the contents at a resolution equal to a lowest resolution associated with the plurality of display receivers when the number of contents to be concurrently encoded exceeds the number of content encoders.

Example 9 may include the subject matter of any one of Examples 1-4, wherein one of the encoding parameters provisioned by the content distribution and coordination policies causes the one or more encoders to encode the contents at a resolution equal to a highest resolution associated with the number of contents when the number of contents to be concurrently encoded exceeds the number of content encoders.

Example 10 is a computer-implemented method for content transmission comprising: coordinating, by a content distribution and coordination engine of a computing device, one or more content encoders to encode a number of contents in accordance with one or more encoding parameters, wherein the one or more encoding parameters are provisioned by a plurality of content distribution and coordination policies; and managing, by the content distribution and coordination engine, respective distribution, via a wireless networking protocol, of the number of encoded contents to a number of display receivers, in accordance with a display protocol supported by each display receiver.

Example 11 may include the subject matter of Example 10, wherein the one or more encoding parameters are selected in view of at least the number of contents to be concurrently encoded and a number of the one or more content encoders.

Example 12 may include the subject matter of Example 10, further comprising providing, by the content distribution and coordination engine, a user interface configured to enable a user to select the number of contents and the number of display receivers to which the content distribution and coordination engine is to distribute the number of contents.

Example 13 may include the subject matter of Example 10, wherein the display protocol is WiDi or Miracast.

Example 14 may include the subject matter of any one of Examples 10-13, wherein one of the encoding parameters provisioned by the content distribution and coordination policies causes each of the number of contents to be assigned to respective ones of the one or more content encoders when the number of content encoders exceeds the number of contents to be concurrently encoded.

Example 15 may include the subject matter of any one of Examples 10-13, wherein one of the encoding parameters provisioned by the content distribution and coordination policies causes the one or more content encoders to encode the contents as intra-frames when the number of contents to be concurrently encoded exceeds the number of content encoders.

Example 16 may include the subject matter of any one of Examples 10-13, wherein one of the encoding parameters provisioned by the content distribution and coordination policies causes the one or more content encoders to encode the contents at a resolution equal to a lowest resolution associated with the plurality of display receivers when the number of contents to be concurrently encoded exceeds the number of content encoders.

Example 17 may include the subject matter of any one of Examples 10-13, wherein one of the encoding parameters provisioned by the content distribution and coordination policies causes the one or more encoders to encode the contents at a resolution equal to a highest resolution associated with the number of contents when the number of contents to be concurrently encoded exceeds the number of content encoders.

Example 18 is one or more computer-readable media, having instructions stored thereon, wherein the instructions, when executed by a computing device provide the computing device with a content distribution and coordination engine configured to: coordinate, by a content distribution and coordination engine of a computing device, one or more content encoders to encode a number of contents in accordance with one or more encoding parameters, wherein the one or more encoding parameters are provisioned by a plurality of content distribution and coordination policies; and manage, by the content distribution and coordination engine, respective distribution, via a wireless networking protocol, of the number of encoded contents to a number of display receivers, in accordance with a display protocol supported by each display receiver.

Example 19 may include the subject matter of Example 18, wherein the one or more encoding parameters are selected in view of at least the number of contents to be concurrently encoded and a number of the one or more content encoders.

Example 20 may include the subject matter of Example 18, further comprising providing, by the content distribution and coordination engine, a user interface configured to enable a user to select the number of contents and the number of display receivers to which the content distribution and coordination engine is to distribute the number of contents.

Example 21 may include the subject matter of Example 18, wherein the display protocol is WiDi or Miracast.

Example 22 may include the subject matter of any one of Examples 18-21, wherein one of the encoding parameters provisioned by the content distribution and coordination policies causes each of the number of contents to be assigned to respective ones of the one or more content encoders when the number of content encoders exceeds the number of contents to be concurrently encoded.

Example 23 may include the subject matter of any one of Examples 18-21, wherein one of the encoding parameters provisioned by the content distribution and coordination policies causes the one or more content encoders to encode the contents as intra-frames when the number of contents to be concurrently encoded exceeds the number of content encoders.

Example 24 may include the subject matter of any one of Examples 18-21, wherein one of the encoding parameters provisioned by the content distribution and coordination policies causes the one or more content encoders to encode the contents at a resolution equal to a lowest resolution associated with the plurality of display receivers when the number of contents to be concurrently encoded exceeds the number of content encoders.

Example 25 may include the subject matter of any one of Examples 18-21, wherein one of the encoding parameters provisioned by the content distribution and coordination policies causes the one or more encoders to encode the contents at a resolution equal to a highest resolution associated with the number of contents when the number of contents to be concurrently encoded exceeds the number of content encoders.

Example 26 is one or more computer-readable media, having instructions stored thereon, wherein the instructions, when executed by a computing device configure the computing device to perform the method of any one of Examples 10-16.

Example 27 is a computing device comprising means for carrying out the method of any one of claims 10-16.

Example 28 is a computing device comprising: means for coordinating one or more content encoders to encode a number of contents in accordance with one or more encoding parameters, wherein the one or more encoding parameters are provisioned by a plurality of content distribution and coordination policies; and means for managing respective distribution, via a wireless networking protocol, of the number of encoded contents to a number of display receivers, in accordance with a display protocol supported by each display receiver.

Example 29 may include the subject matter of Example 28, wherein the one or more encoding parameters are selected in view of at least the number of contents to be concurrently encoded and a number of the one or more content encoders.

Example 30 is a computing device for content transmission comprising: one or more content encoders, each configured to encode content; a communication module coupled with the one or more content encoders, and configured to support a wireless networking protocol to wirelessly transmit encoded content to a plurality of display receivers, wherein each display receiver is configured to support a peer-to-peer display protocol; and a content distribution and coordination engine, coupled to the communication module and the one or more content encoders, and having a plurality of content distribution and coordination policies configured to coordinate the one or more content encoders and the communication module to encode and respectively distribute a plurality of contents to the plurality of display receivers in accordance with the peer-to-peer display protocol and the wireless networking protocol, wherein the plurality of content distribution and coordination policies include provision of encoding parameters to the one or more encoders to use to encode the contents, and wherein the encoding parameters are selected in view of at least a number of contents to be concurrently encoded and distributed in parallel, interleavingly, and the number of the one or more content encoders.

Example 31 may include the subject matter of Example 30, wherein one of the encoding parameters provisioned by the content distribution and coordination policies causes the one or more content encoders to encode the contents as intra-frames when the number of contents to be concurrently encoded exceeds the number of content encoders.

What is claimed is:

1. One or more non-transitory computer-readable media, having instructions stored thereon, wherein the instructions, when executed by a computing device, provide the computing device with a content distribution and coordination engine configured to:
    coordinate, by the content distribution and coordination engine of the computing device, one or more content encoders to concurrently encode a number of content streams in accordance with one or more encoding parameters, wherein the one or more encoding parameters are provisioned by a plurality of content distribution and coordination policies;
    assign, by the content distribution and coordination engine, respective distribution, via a wireless networking protocol, of the number of encoded content streams to a plurality of display receivers, using a WiDi or Miracast display protocol with the plurality of display receivers collectively viewed as a peer of the computing device, based at least on a comparison of the one or more encoding parameters with respective display protocol attributes supported by respective display receivers, wherein the comparison includes one or more frame rates, use of intra-frame encoding, and a display resolution for the content, wherein the number of encoded content streams are interleaved during distribution, wherein one of the encoding parameters provisioned by the content distribution and coordination policies causes the one or more content encoders to encode the content streams as intra-frames when the number of content streams to be concurrently encoded exceeds a number of content encoders; and
    distribute, by the content distribution and coordination engine, at least one encoded content stream to at least one of the plurality of display receivers.

2. The one or more non-transitory computer-readable media of claim 1, wherein the one or more encoding parameters are selected in view of at least the number of content streams to be concurrently encoded and a number of the one or more content encoders.

3. The one or more non-transitory computer-readable media of claim 1, further comprising providing, by the content distribution and coordination engine, a user interface configured to enable a user to select the number of content streams and a number of display receivers to which the content distribution and coordination engine is to distribute the number of content streams.

4. The one or more non-transitory computer-readable media of claim 1, wherein one of the encoding parameters provisioned by the content distribution and coordination policies causes each of the number of content streams to be assigned to respective ones of the one or more content encoders when the number of content encoders exceeds the number of content streams to be concurrently encoded.

5. The one or more computer-readable media of claim 1, wherein one of the encoding parameters provisioned by the content distribution and coordination policies causes the one or more content encoders to encode the content streams at a resolution equal to a lowest resolution associated with the plurality of display receivers when the number of content streams to be concurrently encoded exceeds the number of content encoders.

6. The one or more computer-readable media of claim 1, wherein one of the encoding parameters provisioned by the content distribution and coordination policies causes the one or more encoders to encode the content streams at a resolution equal to a highest resolution associated with the number of content streams when the number of content streams to be concurrently encoded exceeds the number of content encoders.

7. A computing device comprising:
at least one processor;
a non-transitory memory coupled to the at least one processor having instructions stored thereon, wherein the instructions when executed by the one or more processors provide the computing device with:
one or more content encoders, each configured to encode content;
a communication module coupled with the one or more content encoders to support one or more wireless networking protocols to wirelessly transmit encoded content to a plurality of display receivers, wherein each display receiver is to support a WiDi or Miracast display protocol;
a content distribution and coordination engine, coupled to the communication module and the one or more content encoders, and comprising a plurality of content distribution and coordination policies to coordinate the one or more content encoders and the communication module to concurrently encode and respectively distribute a plurality of content streams to the plurality of display receivers in accordance with the WiDi or Miracast display protocol and the wireless networking protocol, based at least on a comparison of one or more encoding parameters with respective display protocol attributes supported by respective display receivers, wherein the comparison includes one or more of frame rates, use of intra-frame encoding, and a display resolution for the content;
wherein a number of encoded content streams are interleaved during distribution;
wherein the plurality of display receivers using the WiDi or Miracast display protocol are collectively viewed as a peer of the computing device;
wherein one of the encoding parameters provisioned by the content distribution and coordination policies causes the one or more content encoders to encode the content streams as intra-frames when the number of content streams to be concurrently encoded exceeds a number of content encoders; and
wherein the content distribution and coordination engine is to distribute at least one encoded content stream to at least one of the plurality of display receivers.

8. The computing device of claim 7, wherein the plurality of content distribution and coordination policies include provision of encoding parameters to the one or more encoders to use to encode the content streams, and wherein the encoding parameters are selected in view of at least a number of content streams to be concurrently encoded and distributed in parallel, the content streams concurrently encoded to be interleaved, and the number of the one or more content encoders.

9. The computing device of claim 8, wherein the content distribution and coordination engine is further configured to enable a user to select the number of content streams and a corresponding number of display receivers to which the content distribution and coordination engine will distribute the number of content streams.

10. The computing device of claim 8, wherein the number of content streams include one or more application interfaces.

11. The computing device of claim 7, wherein one of the encoding parameters provisioned by the content distribution and coordination policies causes each of the number of content streams to be assigned to respective ones of the one or more content encoders when the number of content encoders exceeds the number of content streams to be concurrently encoded.

12. The computing device of claim 7, wherein one of the encoding parameters provisioned by the content distribution and coordination policies causes the one or more content encoders to encode the content streams at a resolution equal to a lowest resolution associated with the plurality of display receivers when the number of content streams to be concurrently encoded exceeds the number of content encoders.

13. The computing device of claim 7, wherein one of the encoding parameters provisioned by the content distribution and coordination policies causes the one or more encoders to encode the content streams at a resolution equal to a highest resolution associated with the number of content streams when the number of content streams to be concurrently encoded exceeds the number of content encoders.

14. A computer-implemented method comprising:
coordinating, by a content distribution and coordination engine of a computing device, one or more content encoders to concurrently encode a number of content streams in accordance with one or more encoding parameters, wherein the one or more encoding parameters are provisioned by a plurality of content distribution and coordination policies;
comparing one or more encoding parameters with respective WiDi or Miracast display protocol attributes supported by a plurality of display receivers, wherein the comparing includes one or more frame rates, use of intra-frame encoding, or a display resolution for the content streams;
managing, by the content distribution and coordination engine, respective distribution, via a wireless networking protocol, of the number of encoded content streams to the plurality of display receivers, in accordance with the respective WiDi or Miracast display protocol attributes supported by respective display receivers;
wherein the number of encoded content streams are interleaved during distribution;
wherein the plurality of display receivers using a peer-to-peer display protocol are collectively viewed as a peer of the computing device;
wherein one of the encoding parameters provisioned by the content distribution and coordination policies causes the one or more content encoders to encode the content streams as intra-frames when the number of content streams to be concurrently encoded exceeds a number of content encoders; and
distributing, by the content distribution and coordination engine, at least one encoded content stream to at least one of the plurality of display receivers.

15. The method of claim 14, wherein the one or more encoding parameters are selected in view of at least the number of content streams to be concurrently encoded and a number of the one or more content encoders.

16. The method of claim 14, further comprising providing, by the content distribution and coordination engine, a user interface to enable a user to select the number of content streams and a number of display receivers to which the content distribution and coordination engine is to distribute the number of content streams.

17. The method of claim 14, wherein one of the encoding parameters provisioned by the content distribution and coordination policies causes each of the number of content streams to be assigned to respective ones of the one or more content encoders when the number of content encoders exceeds the number of content streams to be concurrently encoded.

18. The method of claim 14, wherein one of the encoding parameters provisioned by the content distribution and coordination policies causes the one or more content encoders to encode the content streams at a resolution equal to a lowest resolution associated with the plurality of display receivers when the number of content streams to be concurrently encoded exceeds the number of content encoders.

19. The method of claim 14, wherein one of the encoding parameters provisioned by the content distribution and coordination policies causes the one or more encoders to encode the content streams at a resolution equal to a highest resolution associated with the number of content streams when the number of content streams to be concurrently encoded exceeds the number of content encoders.

20. A computing device for content transmission comprising:
at least one processor;
a non-transitory memory coupled to the at least one processor having instructions stored thereon, wherein the instructions when executed by the at least one processor provide the computing device with:
one or more content encoders, each to concurrently encode content streams;
a communication module coupled with the one or more content encoders to support a wireless networking protocol to wirelessly transmit encoded content streams to a plurality of display receivers, wherein each display receiver is configured to support a WiDi or Miracast display protocol;
a content distribution and coordination engine, coupled to the communication module and the one or more content encoders, and having a plurality of content distribution and coordination policies configured to coordinate the one or more content encoders and the communication module to encode and respectively assign a plurality of content streams to the plurality of display receivers in accordance with the WiDi or Miracast display protocol and the wireless networking protocol, wherein the plurality of content distribution and coordination policies include provision of encoding parameters to the one or more encoders to use to encode the content streams, and wherein the encoding parameters are selected in view of at least a number of content streams to be concurrently encoded and distributed in parallel, the content streams concurrently encoded to be interleaved during distribution, and a number of the one or more content encoders;
wherein the plurality of display receivers using a peer-to-peer display protocol are collectively viewed as a peer of the computing device;
wherein one of the encoding parameters provisioned by the content distribution and coordination policies causes the one or more content encoders to encode the content streams as intra-frames when the number of content streams to be concurrently encoded exceeds the number of content encoders; and
wherein the content distribution and coordination engine is to distribute at least one encoded content stream to at least one of the plurality of display receivers.

* * * * *